Nov. 23, 1965  R. L. ENSINGER  3,218,800

REACTION CONTROL VALVE AND SYSTEM

Filed June 27, 1963  4 Sheets-Sheet 1

INVENTOR.
RAYMOND L. ENSINGER
BY
*Walter Patinoky Jr.*
ATTORNEY

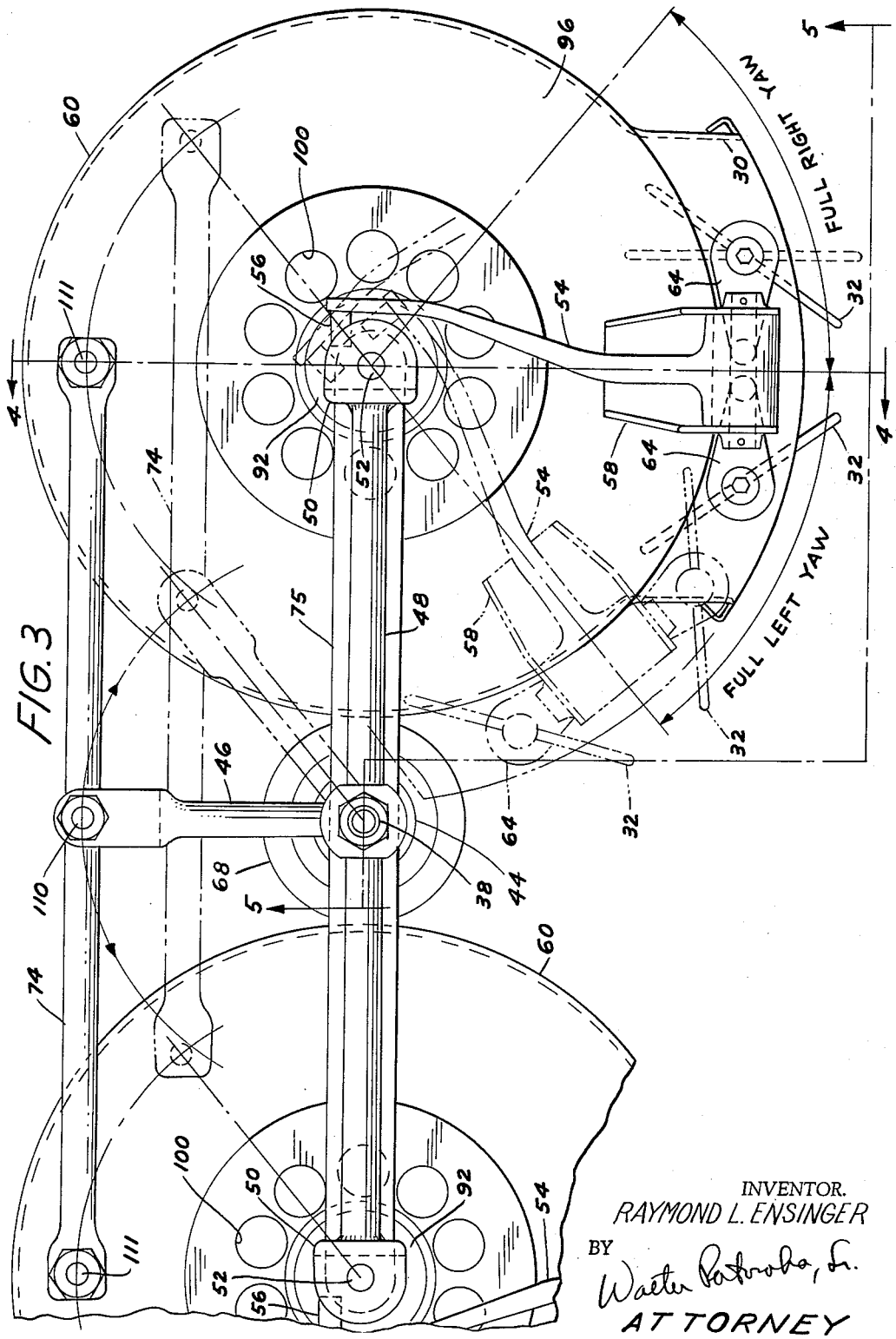

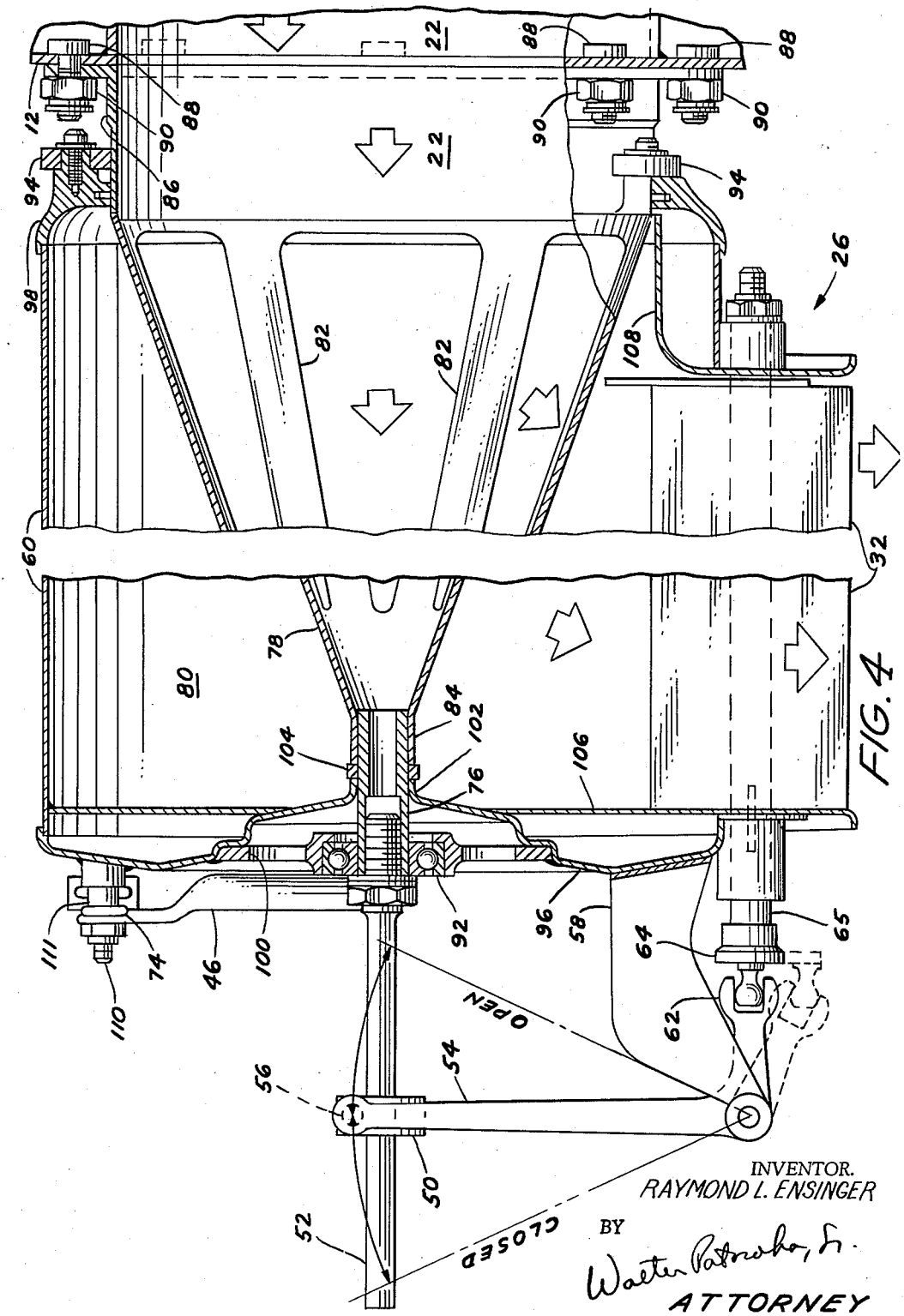

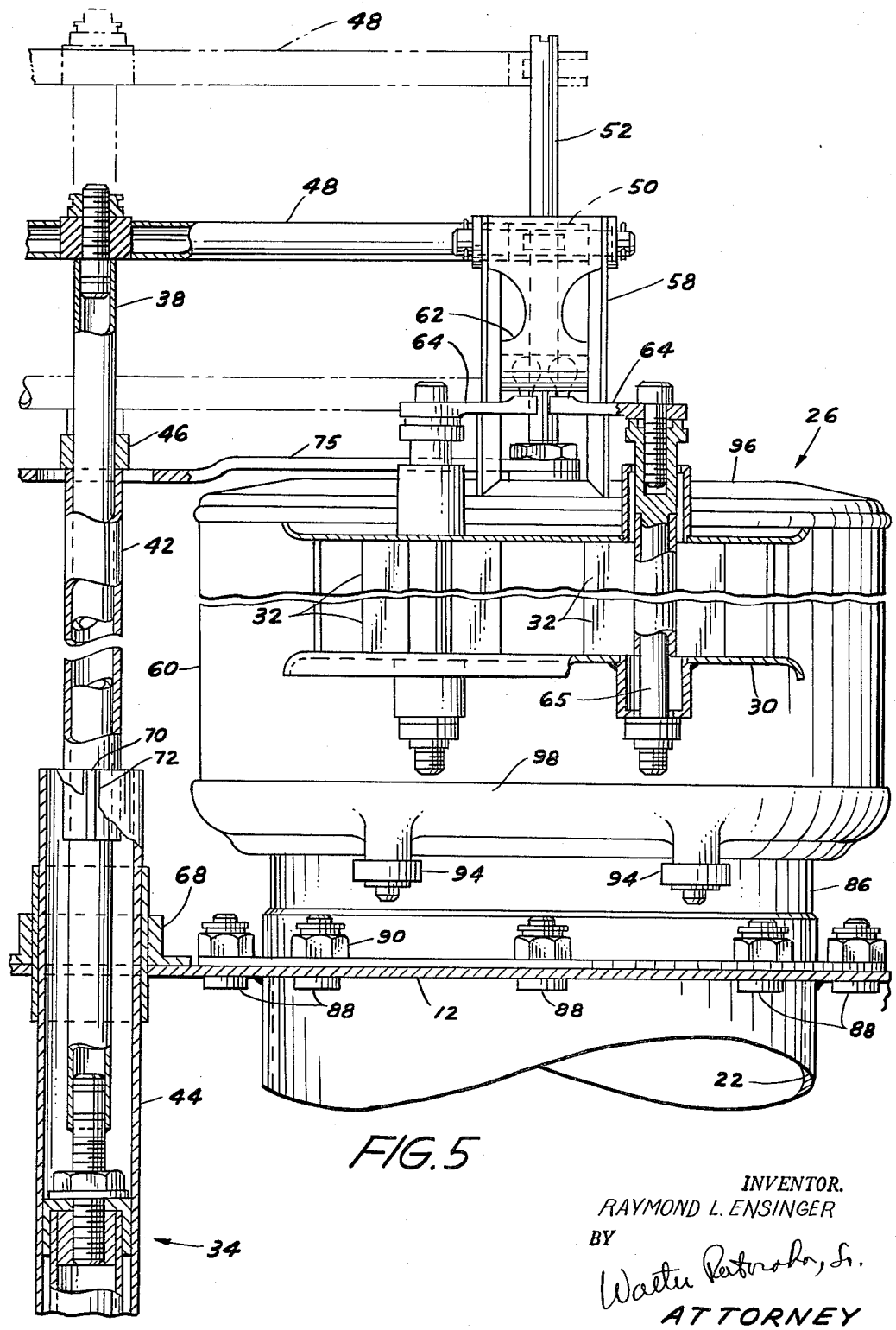

3,218,800
REACTION CONTROL VALVE AND SYSTEM
Raymond L. Ensinger, Detroit, Mich., assignor to Holley Carburetor Company, Warren, Mich., a corporation of Michigan
Filed June 27, 1963, Ser. No. 291,020
2 Claims. (Cl. 60—35.6)

This invention relates generally to reaction control valves, and more particularly to a thrust vector type reaction control valve capable of independently and/or simultaneously varying the magnitude and direction of the thrust force.

Gas turbine engine powered aircraft of the vertical take-off and landing type have been proposed and experimented with in recent years. It is essential that such aircraft have means for controlling the pitch, yaw and roll attitudes thereof. Such means may comprise reaction control valves mounted at the wing tips for roll control and thrust vector type reaction control valves mounted at fore and aft fuselage positions for pitch and yaw control.

Accordingly, a primary object of this invention is to provide reaction control valve and linkage means suitable for mounting at fore and aft fuselage positions for controlling both pitch and yaw moments during the vertical take-off and landing operations of the aircraft.

A more specific object of this invention is to provide such means comprising a pair of thrust vector type reaction control valves mountable at each such position through which the pilot may, either independently or simultaneously, control pitch and yaw, one valve being employed at each position for each engine in the case of a twin engine aircraft.

A still further object is to provide such means that is simple in construction, economical to manufacture and efficient in operation.

Other objects and advantages of the invention will become apparent when reference is made to the following specification and the accompanying drawings wherein:

FIGURE 3 is an enlarged fragmentary front elevational view taken on the plane of line 3—3 of FIGURE 2 and looking in the direction of the arrows;

FIGURE 4 is a side elevational view, in partial cross-section and looking at the right hand end of FIGURE 3;

FIGURE 5 is a cross-sectional view taken along the plane of line 5—5 of FIGURE 3, and looking in the direction of the arrows.

Figure 1:
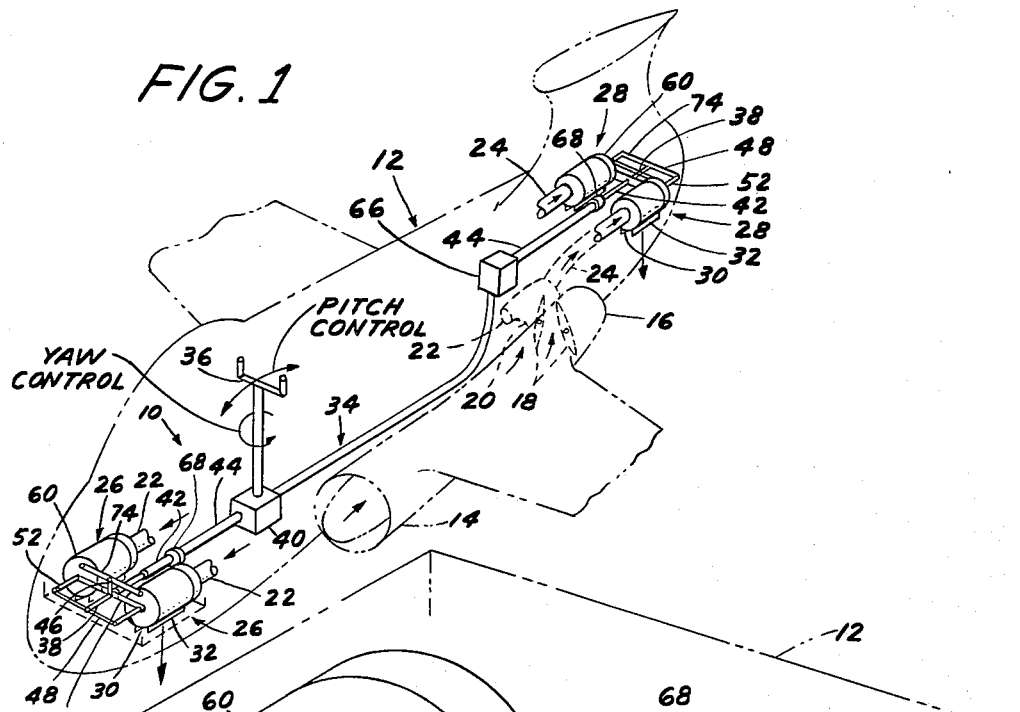
FIGURE 1 is a schematic illustration of a twin-engine aircraft embodying the invention and the controls therefor.

Referring now to the drawings in greater detail, FIGURE 1 illustrates schematically a complete set of thrust vector type reaction control valves 10, as would be required for pitch and yaw control in a vertical take-off and landing vehicle, illustrated generally at 12 and having twin engines 14, one on each side of the fuselage. While a twin-engine installation is shown for purposes of illustration, it will be understood that the invention is equally applicable to single or other multiple engine vehicles.

During vertical flight the exhaust gases from the two engines 14, which for horizontal flight would be discharged through the rear nozzles 16, are directed by means of diverter valves 18, controlled by the pilot, into ducts 20 which branch into passages 22 and 24. The exhaust gases which are transmitted in this manner to the identical fore and aft valves 26 and 28 are then discharged downwardly into the atmosphere, in a manner to be described later, through a rectangularly shaped opening 30 in each valve, the size of each opening 30 being varied by means of pivotable vanes 32. The vanes 32 are controlled through linkage 34 connecting to the pilot's control lever 36.

In the following discussion of the pitch and yaw control structures, it will be understood that the fore valves 26 and the aft valves 28 and their associated linkages are essentially identical, except possibly for dimensional variations to provide different thrust capacities at one end or the other of the fuselage; thus, similar parts are identically numbered.

PITCH CONTROL STRUCTURE

Forward and rearward movement of the pilot control lever 36 causes reciprocating movement of the extreme foremost linkage extention 38 by means of a suitable gear or other control unit 40. As better seen in FIGURE 5, the linkage extension 38 slides within a pair of larger tubular members 42 and 44 which are anchored against forward and rearward movement.

Figure 2:
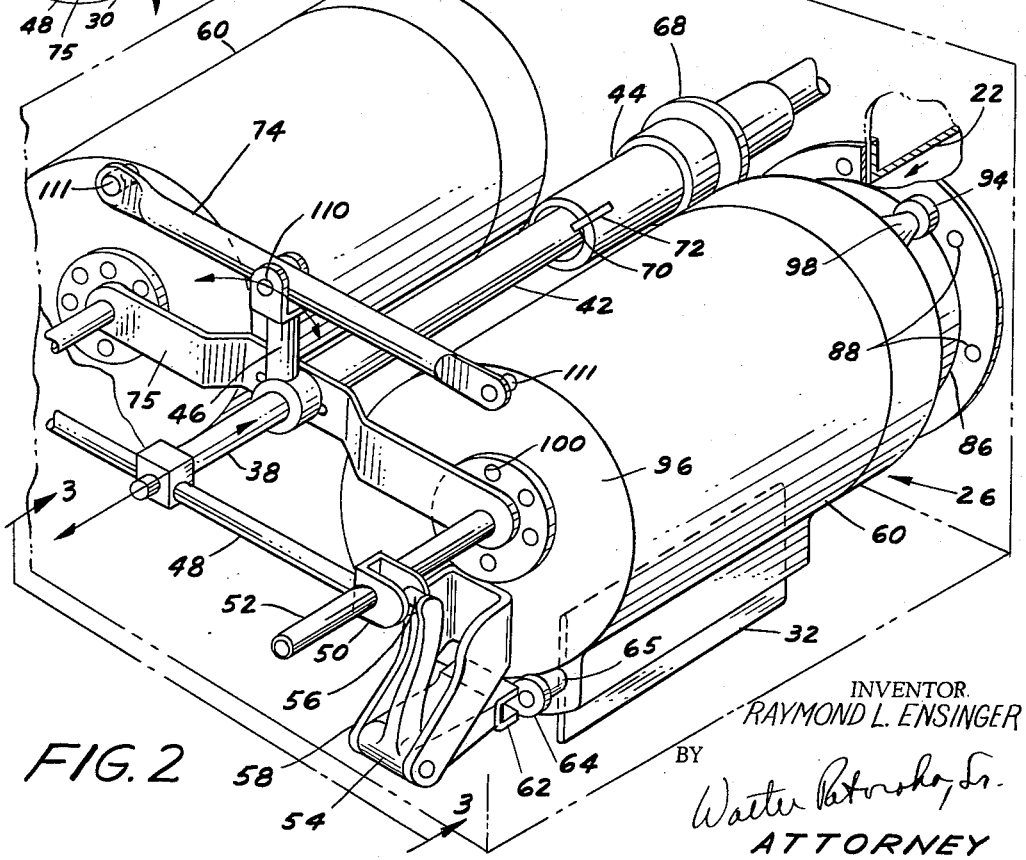
FIGURE 2 is a perspective view of that portion of the invention shown by the lower portion of FIGURE 1.

As seen in FIGURES 2 and 5, the linkage 38 also slides through a lever 46 which is fixedly attached to the tubular member 42. The linkage 38 is fixedly attached at its end to a cross member 48. A slotted guide member 50, permanently affixed to each end of the cross member 48, slides along a shaft 52 extending from each of the valves 26 and 28. An L-shaped pitch lever 54 having one end thereof operatively connected to the guide member 50 by means of a lug 56 is pivotally supported in a bracket 58 mounted on the valve housing 60. The other end 62 of the pitch lever 54 is operatively connected to a pair of bell cranks 64 (FIGURES 3 and 4). In each valve, two bell cranks 64 are fixed to the ends of the rotatively mounted shafts 65 to which the vanes 32 are connected so as to be positioned in the opening 30. Thus, the pivotable vanes 32 serve to vary the effective area of the opening 30 and, hence, to regulate the thrust thereof.

By means of a suitable gear or other arrangement in the rear control box 66, movement of the rear linkage 38 within its outer tubing 44 by the pilot control lever 36 will serve to move the rear bell cranks 64 in a direction opposite to that of the front bell cranks 64. Hence, the thrust of the aft valve 28 is correspondingly decreased as the thrust force through the fore valve 26 is increased, thereby providing proper pitch control of the aircraft 12 to maintain the fuselage centerline in a horizontal plane.

YAW CONTROL STRUCTURE

In regard to yaw control, reference may again be made to FIGURE 5. The pilot's rotation of the control lever 36 and operation of the control box 40 causes the outer tubing 44 to rotate within the mounting bushing 68. The outer tube 44 is operatively connected to the smaller diameter tube 42, as by means of vanes 70 which may extend outwardly from the smaller tube 42 into suitable notches 72 formed in the larger tube 44. The pitch control link 38 is, of course, movable through the tubing 42. The lever 46, through which the pitch control link 38 also reciprocates, is fixedly attached to the end of the tubing 42 in any suitable manner, such as by welding. Thus, it can be observed that rotation of the large tube 44 will directly cause the smaller outer tube 42 and the lever 46 to be rotated about the link 38.

As better seen in FIGURE 3, the lever 46 is pivotally attached to a cross-lever 74 which is, in turn, pivotally attached at its ends to the two adjacent control valve housings 60. Therefore, it is evident that, as the lever 46 is rotated, the two valve housings 60 will likewise be rotated about their center shafts 52. This rotation, of course, would be independent of the particular angle of the vanes 32, but would radially reposition the direction of the opening 30 in which the vanes 32 are located. The two valve housings 60 are retained in proper spaced relationship to one another by means of a bracket 75.

As observed in FIGURE 4, the stationary shaft 52 is threadedly attached to a tubular member 76 extending into the valve housing 60. A conical shaped member 78 disposed within the chamber 80 and having a plurality of ribs 82 is attached at its smaller end 84 to the tubular member 76; the larger flanged end 86 of member 78 is secured to the aircraft structure 12 surrounding the passageway 22. Attachment of the flanged end 86 to the aircraft structure 12 may be by any suitable means such as bolts 88 and nuts 90.

Rotation of the valve housing 60 is made possible by virtue of front and rear bearings 92 and 94, respectively. The front bearing 92 is fixedly attached to the front cover 96 so as to permit rotation thereof about the tubular member 76, whereas the plurality of rear bearing wheels 94 are fixedly attached to the end section 98 of the valve housing 60 so as to permit rotation of the housing about the larger fixed end portion 86 of the conical member 78. Openings 100 in the front bearing 92 provide for air circulation which tends to dissipate heat from the bearing 92.

The front cover 96 is formed in such a way that its central hub 102 is loosely fitted and, hence, free to revolve around the tubular member 76. A seal 104, tightly fitted around the tubular member 76, is positioned between the small end of the stationary conical member 78 and the loosely fitted end 102 of the rotatable front cover 96.

The exhaust gases entering the chamber 80 of the valve housing 60 from the passageway 22 flow between the ribs 82 of the conical member 78, and they are diverted downwardly past the vanes 32 controlling the area of the opening 30 by means of baffles 106 and 108 permanently affixed to the inner wall of the valve housing 60 in any suitable manner, such as by welding.

Operation

The operation of the pitch and yaw control valves 26 and 28 is evident from the preceding description of their construction. However, it is deemed advisable to give an over-all summary of their operation. Referring to FIGURE 1, one may visualize the system 10 illustrated therein as including the pair of valves 26 located in the fore part of a vertical take-off and landing aircraft 12, and a pair of valves 28 located in the aft section of the aircraft 12.

The particular aircraft 12 which would employ such a system would include two gas turbine engines 14, with one fore and one aft valve being provided for each engine 14. Each set of one fore and one aft valve 26 and 28, respectively, receives exhaust gases providing the thrust or reactive force from one of the pair of engines 14, via the passageways 20, 22 and 24. This is accomplished by virtue of there being a pair of so-called diverter valves 18 located in the aircraft 12 at the rear of each engine 14. These valves 18 cooperate to permit the exhaust gases to discharge through the rear nozzle 16 during horizontal flight operation, while blocking off the flow of the discharge gases to the passageways 20, 22 and 24. During the vertical take-off or landing operation, the diverter valves 18 are positioned by the pilot to block off the flow of discharge gases through the rear nozzle 16 and to divert a portion of (most of the exhaust gases are used in a separate nozzle system providing the thrust to lift the aircraft, and only a portion is used for pitch and yaw control) the total exhaust flow into the duct 20 which then branches off so that the gases flow into the two main passageways 22 and 24 communicating with the valves 26 and 28, respectively.

The resultant thrust at each of the valves 26 and 28 is then controlled in order to maintain the fuselage centerline of the aircraft 12 on a horizontal plane (pitch) and in the desired direction (yaw). Pitch control is accomplished by moving the pilot control lever 36 either forward or rearward in order to cause the vanes 32 in the outlet 30 to be pivoted through the members 38, 48, 50 and 54 and the attached bell crank 64 (FIGURE 2), as described above. As previously noted, the linkage 34 and control box mechanisms 40 and 66 (FIGURE 1) are such that, as the vanes 32 of the fore valves 26 are opened to provide an increased thrust area and hence a greater thrust force, the vanes 32 on the aft valves 28 are correspondingly closed in order to provide a smaller thrust area and hence a lesser thrust force. This, of course, would raise the front end of the aircraft 12 and lower the tail section thereof. The opposite result is attained when the fore valves are closed and the aft valves are opened. If the one end of the aircraft 12 is heavier than the other, the maximum size of the opening 30 of that set of valves may be designed for correspondingly increased thrust capacity.

If it is necessary to correct for a yaw condition, the pilot control lever 36 may at any time be rotated, for example, in a clockwise direction. As previously explained, the control linkage 34, better seen in FIGURES 2 and 5, is such that, as the control lever 36 is rotated, the larger outer tube 44 will also be rotated. This, in turn, will rotate the smaller outer tube 42 by means of the vanes 72. The lever 46, being fixedly attached to the tube 42, is rotated by the latter to the right. The cross lever 74, being pivotally attached to the lever 46 will be moved to the right, pivoting about the pin 110. The end of the lever 74, being pivotally attached at 111 to the front cover 96 will therefore rotate the housing 60 to the right. Thus, it can be seen that the direction of the thrust force would have been charged by virtue of the housing 60 and the attached vanes 32 having been rotated to some new position. As explained previously, the linkage system 34 (FIGURE 1) is such that, as the vanes 32 of the fore valve 26 are thus rotated in a clockwise direction about the valve center shaft 52, the vanes of the aft valve 28 are caused to rotate a corresponding amount in a counterclockwise direction. This, of course, serves to rotate the aircraft 12 about its vertical axis to regain a desired nose direction.

From the above discussion, it is apparent that this combination of pitch and yaw control, along with roll control, the latter not being included as a part of this invention but provided for by roll control valves at the wing tips, will constitute a system whereby the pilot may maintain the aircraft in a perfectly level attitude while ascending or decending, and at the same time control the exact direction in which the aircraft is pointing.

It should also be apparent that the invention provides novel means for modulating thrust for pitch and yaw control by inversely varying the size and relative positions of rectangularly shaped flow areas of the front and rear valves, in response to manual movement of the pilot control lever. Further, the size and position of the flow area opening may be controlled either independently or simultaneously, thus providing a substantially unlimited combination of thrust vectors.

Although but one embodiment of the invention has been disclosed and described, it is apparent that other modifications are possible within the scope of the appended claims.

What I claim as my invention is:

1. A thrust reaction control valve, said valve comprising a housing having a chamber therein and a stationary center member, said center member including a rod extending from one end of said housing, a tubular inlet at the other end of said housing and a ribbed conical member extending across said chamber and fixedly attached at its smaller end to said rod and at its larger end to said tubular inlet; an opening through a wall of said housing, a pair of vanes rotatively mounted across said opening, an off-center projection fixedly attached to one end of each of said vanes, a first angled lever operably connected at one end thereof to said off-center projection, a second guide lever slidably mounted on said rod and operably connected to the other end of said angled lever, means for at times sliding said guide lever along said rod for rotating said vanes in said opening, a third lever connected at its one end to an end of said housing substantially near the circumferential surface thereof, a fourth lever pivotally connected at its one end to said third lever, and means perpendicularly connected to the other end of said fourth lever for at times rotating said fourth lever about the axis of said last mentioned means for in turn rotating said housing about said stationary center member.

2. A thrust reaction control valve, said valve comprising a housing having a chamber therein and a center member, said center member including a member extending from one end of said housing, an inlet at the other end of said housing and a ribbed member extending across said chamber and fixedly attached at its one end to said member and at its other end to said inlet; an opening through a wall of said housing, a pair of vanes rotatively mounted across said opening, an off-center projection fixedly attached to one end of each of said vanes, a first lever operably connected at one end thereof to said off-center projection, a second lever slidably mounted on said member and operably connected to the other end of said lever, means for at times sliding said second lever along said member for rotating said vanes in said opening, a third lever connected at its one end to an end of said housing apart from the center thereof, a fourth lever pivotally connected at its one end to said third lever, and means operably connected to said fourth lever for at times rotating said fourth lever about the axis of said last mentioned means for in turn rotating said housing about said center member.

References Cited by the Examiner

UNITED STATES PATENTS

| | | | |
|---|---|---|---|
| 2,373,575 | 4/1945 | Lemonier | 244—83 |
| 3,002,709 | 10/1961 | Cochran | 244—52 X |
| 3,111,289 | 11/1963 | Murphy | 244—52 |

FOREIGN PATENTS

| | | |
|---|---|---|
| 1,146,184 | 5/1957 | France. |
| 806,030 | 12/1958 | Great Britain. |

FERGUS S. MIDDLETON, *Primary Examiner.*